Sept. 22, 1970   C. L. SCHEER   3,530,207
METHOD AND APPARATUS FOR PRODUCING MATERIAL IN BEAD FORM
Filed April 3, 1968

INVENTOR:
CHARLES L. SCHEER
BY Howson & Howson
ATTYS.

United States Patent Office 3,530,207
Patented Sept. 22, 1970

3,530,207
METHOD AND APPARATUS FOR PRODUCING MATERIAL IN BEAD FORM
Charles L. Scheer, Berwyn, Pa., assignor to Foote Mineral Company, Exton, Pa., a corporation of Pennsylvania
Filed Apr. 3, 1968, Ser. No. 718,627
Int. Cl. B29c 23/00
U.S. Cl. 264—14     12 Claims

ABSTRACT OF THE DISCLOSURE

Beads of lithium are produced by introducing a stream of molten lithium into a vortex in a hydrocarbon oil bath maintained at a temperature below the melting point of lithium. The lithium is thereby broken up into molten globules which freeze into substantially spheroidal solid beads in the hydrocarbon oil and which are impelled downwardly and outwardly around the lower edge of a separatory screen surrounding the vortex; being lighter than the oil, they float to the surface outside the screen, whence they are collected. The screen is of sufficiently fine mesh to prevent return of the floating solid beads to the vortex while permitting flow of oil through it to maintain the vortex.

BACKGROUND OF THE INVENTION

The invention relates to methods and apparatus for converting materials to bead form, and especially for producing generally shot-size beads of light metals such as lithium, sodium, potassium and cesium.

Applications are known in which it is desirable to provide materials in the form of beads, preferably substantially spherical, in the size range of from about ten mils to about ½ inch diameter. Lithium is an example of such a material, and has a chemical activity dependent upon the ratio between its surface area and its volume and hence upon the size of the bodies into which it is formed. Methods are known for producing very fine particles of lithium, using a chemical dispersant to prevent agglomeration, and because of the small particle size the metal is very active. Lithium can also be cast into large ingots, in which case its activity is low, and it is difficult to disperse in small metered quantities. However, no satisfactory method has heretofore been known by which intermediate-sized bodies of lithium of reproducible size and shape could be produced easily, reliably, economically, and substantially free of harmful contamination. This invention is particularly applicable to such production of intermediate-sized bodies of lithium, but may be applied to other substances, particularly to light active metals such as sodium, potassium and cesium.

Accordingly it is an object of the invention to provide a new and useful method and apparatus for the production of materials in bead form.

Another object is to provide a new and useful method and apparatus for producing shot-sized beads of lithium or similar light metals.

A further object is to provide such a method and apparatus which operate easily, reliably, economically and without producing harmful contamination of the bead material.

SUMMARY OF THE INVENTION

These and other objects of the invention are achieved by the provision of a method and apparatus in which a stream of molten material is introduced into a fluid having differential flow rates therein to produce a shearing action which serves to break up the molten material into molten globules, the globules then freezing into shot-sized substantially spheroidal solid beads. Preferably the differential flow is provided by a vortex in the fluid, the solid beads are less dense than the fluid in which they are formed, and a separatory member such as a fine-mesh screen extends downwardly from the fluid surface at a position radially outward from the center of the vortex beyond the point at which the molten material is introduced; the speed of the vortex and the position of the lower edge of the separatory member are preferably selected so that the molten material is impelled outward from the vortex and around the lower edge of the separatory member, after which the beads float to the surface and are segregated from the vortex in a position in which they may readily be collected.

In a preferred embodiment the molten material is lithium and the fluid is a hydrocarbon oil having a density greater than that of lithium and a flash point above the temperature of the lithium introduced into it, and which is chemically inert with respect to lithium. The separatory member is preferably a cylindrical screen concentric with, and outside of, the vortex and having a mesh fine enough to reject the solid beads while permitting free passage of the oil.

BRIEF DESCRIPTION OF FIGURES

These and other objects and features of the invention will be more readily understood from a consideration of the following detailed description, taken in connection with the accompanying drawings, in which.

DETAILED DESCRIPTION OF PREFERRED EMBODIMENT

Figure 1:
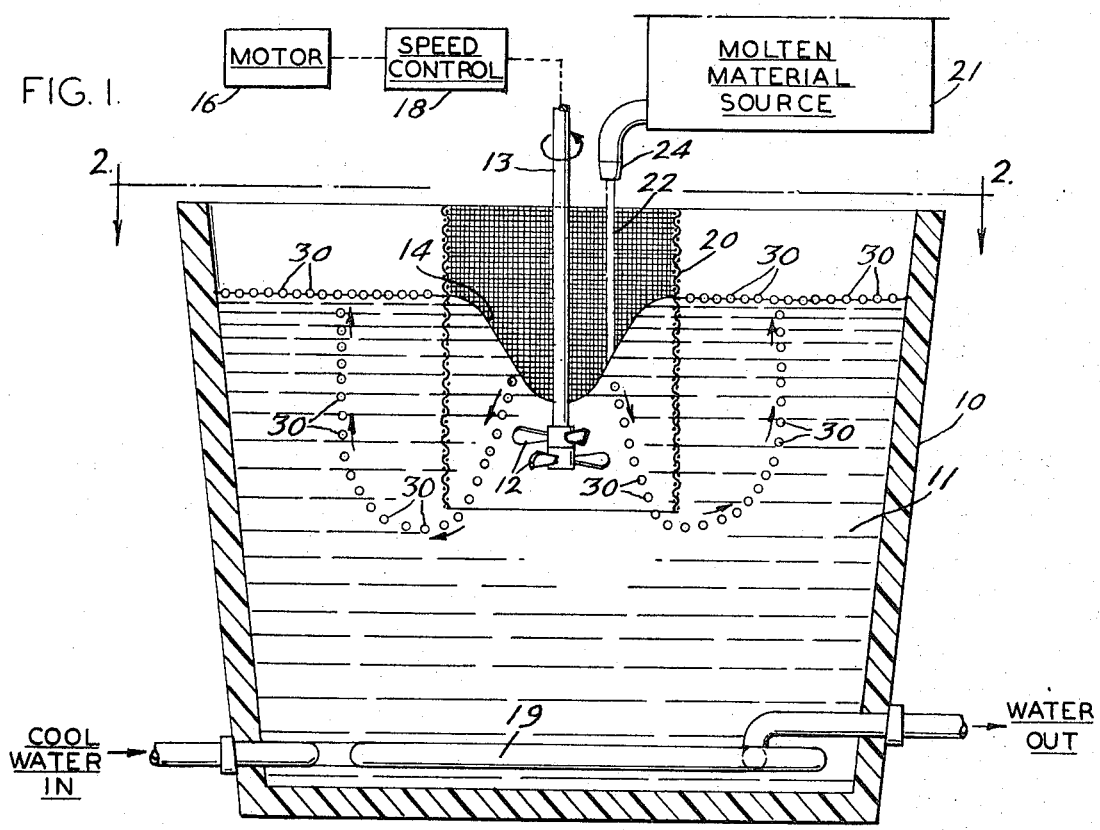
FIG. 1 is a longitudinal sectional view showing apparatus in accordance with the invention suitable for use in performing the inventive process.
Figure 2:
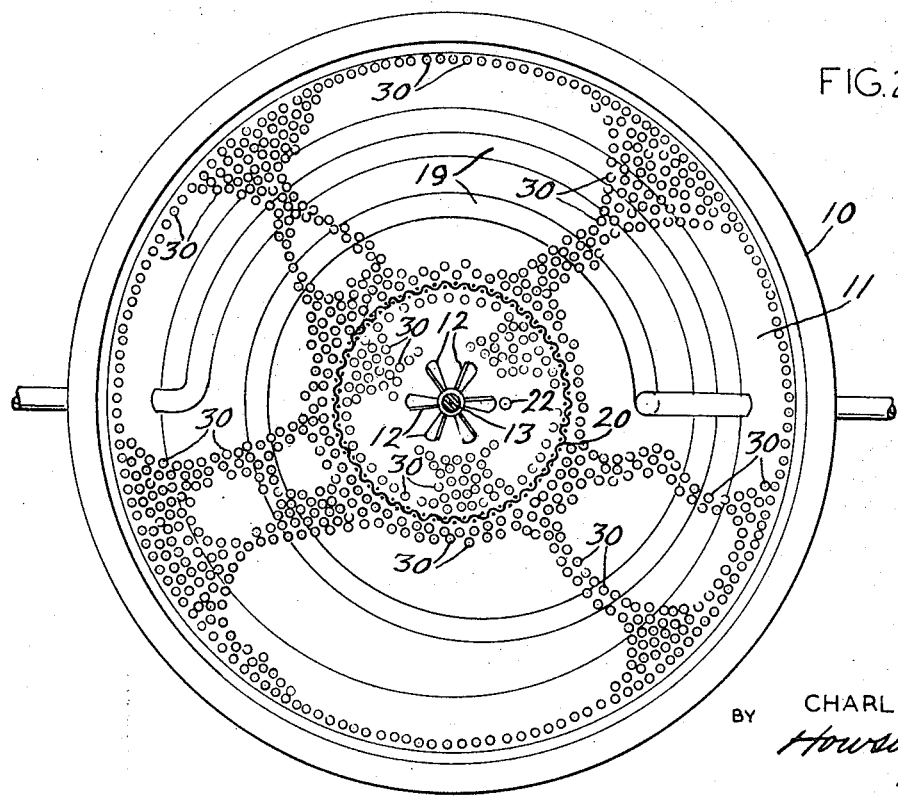
FIG. 2 is a plan view in full showing this apparatus as viewed along the direction 2—2 of FIG. 1.

Referring now by way of example only to the apparatus shown in the figures, a tank 10 of inert material such as stainless steel is nearly filled with a bath 11 of hydrocarbon oil. Impeller blades 12 positioned beneath the surface of the oil near the center of the tank are mounted on a vertical impeller shaft 13 extending upwards through the surface, and provide means for producing a vortex 14 in the oil at the center of the tank above the blades 12 upon rotation of shaft 13. A conventional motor 16 and speed control 18 are mechanically coupled to impeller shaft 13 to rotate it at any desired rate, thereby to control the size and speed of the vortex. Cooling coils 19 in the bottom of the tank are provided with a flow of cool water to maintain constant the temperature of the oil bath; the flow of water may be thermostatically controlled, if desired.

A separatory member in the form of a cylindrical screen 20 is disposed upright about, and concentric with, the center of vortex 14. Screen 20 is of sufficiently fine mesh to prevent passage through it of the lithium beads to be formed, yet permits the oil to flow through it readily. Screen 20 extends upwardly through the surface of the oil, and downwardly sufficiently to ensure segregation from the vortex of the floating solid beads while still permitting the metal globules from the vortex to pass outward beneath its lower edge.

A source 21 of molten material, in this example lithium, is dispensed downwardly in a molten stream 22 from an outlet 24, onto the side of vortex 14. The differential circulating flow rates of the oil in the vortex break up the stream 22 into molten globules such as 30, and cast them downwardly and outwardly along a path extending below the lower edge of screen 20. The globules tend to form into spheres due to surface tension, and freeze into solid substantially spheroidal beads during their passage through the oil, which is maintained at a temperature below the melting point of the metal. Because the metal is less dense than the oil, the beads float to the top of the oil outside of the screen whence they can be readily removed. The oil coating on the beads protects the active metal from atmospheric attack.

Without thereby in any way limiting the scope of the invention, a specific working example will now be given of one use of the inventive method and apparatus to produce substantially spheroidal lithium shot in the size range from about ⅛ inch to about 3/16 inch in diameter.

Tank 10 is 14 inches high, with a top diameter of 18 inches and a bottom diameter of 15 inches. The tank is filled to about 2 inches from its top with a white mineral oil manufactured under the name Blandol by Sonneborn Division of Witco Chemical Company; the specific gravity of the oil is 0.845 to 0.860 gram per cc. at 60° F., its Saybolt viscosity is 80 to 90 seconds at 100° F. and its flash point is about 350° F. The impeller comprises a pair of 3-bladed propellers, each 2 inches in diameter, the top propeller being about 3 inches below the oil surface. The motor speed is adjusted within a range from about 1450 to 1500 r.p.m. to produce a smooth vortex 14 approximately 2½ inches deep, without undue oil splashing. Where the precess is to be performed continuously over a substantial time interval, water flow through the cooling coils is preferably provided to maintain the bath temperature near room temperature, so that the viscosity of the oil will remain nearly constant and thus provide uniform conditions for promoting the desired beading, freezing, and path of travel of the lithium globules.

The separatory member 20 is a 10-mesh wire screen of cylindrical form having a diameter of 5½ inches and a height of 7 inches, held upright (by means not shown) and concentric with the vortex so that it extends 2 inches above the oil surface and 5 inches below the surface.

Molten lithium at about 415° to 425° F. is provided in source 21 and permitted to flow downwardly in a stream 22 about ¼ inch in diameter, to strike the side of vortex radially slightly outward from the tips of the propeller blades. The lithium is thereby carried around the vortex and is broken up into globules, which freeze into substantially spheroidal form, pass outwardly and downwardly between the tips of the propeller blades and the lower edge of screen 20, and float to the surface outside the screen because the specific gravity of the lithium (0.54 gram/cc.) is less than that of the oil (0.85 gram/cc.). The floating beads are removed with a screen-bottomed ladle to permit excess oil to drain back into the tank.

Bead size and uniformity are controllable by adjustment of feed rate and temperature of molten lithium stream, impeller speed, and oil bath temperature. In particular, smaller beads are produced by lower feed rates, by higher temperatures of lithium, by higher impeller speeds and by lower oil temperatures with corresponding higher oil viscosity.

The point of introduction of the molten material into the vortex also affects both the extent of shearing action of the globules, and may be changed to adjust the bead size and to provide the desired trajectory between the impeller blades and the lower edge of the screen. In addition, the relative vertical positions of the lower edge of the screen 20 and of the impeller blades may be adjusted to ensure the desired escape of the lithium globules; in different applications the diameter of the screen may also be selected differently, for the same purposes.

As mentioned hereinbefore, the above specific detailed example has been provided merely by way of example. More generally, the fluid used for the bath may be any of numerous different types, so long as it has a density or specific gravity greater than that of the solid beads, is stable at the temperature of the incident molten bead material, has a viscosity sufficient to break up the incident bead material into globules of the desired size, can be maintained at a low enough temperature to freeze the bead material rapidly, and produces no debilitating chemical or physical contamination of the bead material. Hydrocarbon oils have been found particularly suited for the purpose.

The nature and position of the impeller arrangement may also be quite different from that shown, and the impeller may, for example only, be driven by a shaft extending upward through the bottom of the tank. The material, configuration, size and location of the separatory member may take many forms, so long as it permits passage around the lower edge of the separatory member of the bead material from the vortex and prevents return of the floating solid beads to the vortex. A foraminous member of circular cross-section, completely surrounding the vortex is preferred for this purpose. Various metals other than lithium, such as sodium, potassium and cesium, are especially suited for use as the bead material since they are light and have low melting points; however, other metals, alloys and non-metals may also be used.

In some cases also, the desired differential flow rates may be produced by means other than a vortex, for example by a pump or other mechanical means for producing the necessary shearing action in the fluid.

Accordingly, while the invention has been described in detail with specific reference to one particular embodiment thereof, it will be understood that it may be embodied in a variety of forms diverse from those described in detail without departing from the scope of the invention as defined by the appended claims.

What is claimed is:
1. A method of forming shot-sized beads of a material, comprising:
(a) producing a vortex within a body of liquid having a density greater than that of said material, said material being non-soluble in and inert to said liquid, and
(b) introducing a continuous molten stream of said material into said vortex at a predetermined point therein to pass through said vortex, while positioning adjacent said point and in said liquid a separatory member having a lower open end spaced above the bottom of said body of liquid and having an upper open end extending substantially to the surface of said liquid,
(c) said liquid having a temperature below the melting point of said material, the velocity of the liquid in said vortex and the position of said point of introducing of said molten stream being such as to break up said molten material into globules and to move said globules outwardly and downwardly beyond said lower open end of said separatory member, without further break up of said globules, whereby said globules are solidified and float to the surface of said liquid in the form of shot-sized beads which are restrained by said separatory member from again passing through said vortex.

2. The method of claim 1, in which said material is selected from the group consisting of lithium, potassium, sodium, cesium and alloys thereof.

3. The method of claim 2, in which said liquid is a hydrocarbon oil.

4. The method of claim 3, in which said material is lithium.

5. The method of claim 1, in which said separatory member is foraminous, encloses said vortex, and has apertures small enough to prevent passage therethrough of said solid beads.

6. The method of claim 1, in which said material is lithium and said liquid is a hydrocarbon oil.

7. The method of claim 1, in which said separatory member comprises a mesh screen.

8. The method of claim 1, in which said vortex is produced by a rotating impeller in said liquid beneath said vortex, said material globules moving in said liquid without contacting said impeller.

9. Apparatus for forming shot-sized beads of a material, comprising:
   (a) a container for liquid,
   (b) a liquid in said container having a density greater than that of said material and a temperature below the melting point of said material,
   (c) means for forming a vortex in said liquid,
   (d) a foraminous separatory member with open ends, surrounding said vortex and extending substantially to the surface of said liquid, said member having a lower end spaced above the bottom of said container, and
   (e) means for introducing a melt of said material into said liquid vortex within said separatory member for breaking up said melt into globules and for moving said globules downwardly and outwardly around the open lower end of said separatory member as said globules solidify and rise to float on said liquid outside said separatory member.

10. The apparatus of claim 9, in which said separatory member is a mesh screen.

11. The apparatus of claim 9, in which at least the lower end of said separatory member is of circular cross-section concentric with said vortex.

12. The apparatus of claim 9, in which said vortex-forming means comprises a rotary impeller beneath the surface of said liquid, said vortex being such as to provide a path for said globules which does not intersect said impeller.

References Cited

UNITED STATES PATENTS

| | | | |
|---|---|---|---|
| 2,652,386 | 9/1953 | Wallman | 264—9 |
| 2,399,191 | 4/1946 | Abbott | 264—13 |
| 3,071,815 | 1/1963 | Mackinnon | 264—9 |
| 3,260,773 | 7/1966 | Thornton | 264—14 |

DONALD R. ARNOLD, Primary Examiner

J. R. HALL, Assistant Examiner

U.S. Cl. X.R.

18—2.4, 2.5